United States Patent Office.

GEORGE W. CODDINGTON, OF MIDDLETOWN, OHIO.

COMPOSITION FOR SEALING-WAX.

SPECIFICATION forming part of Letters Patent No. 307,746, dated November 11, 1884.

Application filed October 13, 1883. (Specimens.)

*To all whom it may concern:*

Be it known that I, GEORGE W. CODDINGTON, of Middletown, in the county of Butler and State of Ohio, have invented certain new and useful Improvements in Composition for Sealing-Wax, of which the following is a specification.

The object of my invention is to produce a sealing-wax which shall possess to a large extent the qualities of wax composed largely of beeswax, but which shall be more tenacious and much cheaper. This wax is especially applicable to sealing cans containing fruit, vegetables, meat, and the like; and in this connection I prefer to employ it in the form of waxed strings, prepared by a machine which is also of my invention, and which forms the subject for separate Letters Patent. This wax may, however, if desired, be employed in the usual manner for sealing cans. The wax consists of a composition of resin, oil or tallow or other oily substance or substances, and a fibrous material—such as cotton or hemp fiber, asbestus, or agatite finely ground—and mixed for ordinary purposes in the proportion of sixteen parts resin, one to two parts tallow or oil, and two parts of the fibrous material. The resin and tallow are first well mixed, after which the fibrous material is added and the whole thoroughly mixed, and the mixture is then poured out into molds of any desired size and shape and allowed to cool, when it is ready for use.

If the wax is to be used in the manner most common for sealing cans, it is molded into sticks, in which shape it is placed in the market; but if it is to be used in the form of waxed strings, as above mentioned, the strings are properly coated with the wax while it is in a molten or liquid state and allowed to harden on the strings.

The resin which I preferably employ is that known as "pine-tree resin," and the preferred grades are E and F. For the lower grades a greater amount of oil or tallow or other oily substance will be required. The objection to the lower grades of resin is, that they make a dark-colored wax, which is not so handsome or salable as the lighter-colored wax made from the higher grades of resin.

The preferred description of oil or oily substance or substances which enter as an ingredient or ingredients into the above-described composition are what are known as "non-driers," and of these non-driers the preferred are such as tallow, lard, paraffine-oil, and cotton-seed oil.

The precise proportion of resin or oil may be somewhat varied in case it is desired to make the wax harder or softer. By increasing the proportion of resin the wax is made harder, and by increasing the proportion of oil it is made softer, and it may thus be made of any desired degree of hardness. The fibrous material employed imparts to the wax a very tough and tenacious property, which causes it to adhere very firmly to the can, and prevents it from being drawn in by the cooling of the contents of the can.

The ingredients of this wax are all very cheap, and therefore the finished wax may be produced very cheaply.

Having thus described my invention, what I claim as new, and desire to secure by Letters Patent, is as follows:

1. A sealing-wax consisting of resin, oil or oily substance or substances, and finely-ground fibrous material, substantially as and for the purposes specified.

2. The herein-described sealing-wax, consisting of resin, tallow, and finely-ground fibrous material, melted and mixed together in the proportion of sixteen parts of resin, one to two parts of tallow, and two parts of the fibrous material, substantially as and the purposes specified.

GEORGE W. CODDINGTON.

Witnesses:
J. WM. STREHLI,
WALTER CHAMBERLIN.